(12) United States Patent
Cao

(10) Patent No.: US 12,625,516 B1
(45) Date of Patent: May 12, 2026

(54) THREE-SCREEN DISPLAY

(71) Applicant: Junxuan Cao, Guangdong Province (CN)

(72) Inventor: Junxuan Cao, Guangdong Province (CN)

( * ) Notice: Subject to any disclaimer, the term of this patent is extended or adjusted under 35 U.S.C. 154(b) by 0 days.

(21) Appl. No.: 19/355,280

(22) Filed: Oct. 10, 2025

(30) Foreign Application Priority Data

Sep. 19, 2025 (CN) ........................ 202522028383.X

(51) Int. Cl.
| | |
|---|---|
| *G06F 1/16* | (2006.01) |
| *G06F 1/18* | (2006.01) |
| *H05K 5/00* | (2025.01) |
| *H05K 7/00* | (2006.01) |

(52) U.S. Cl.
CPC ............ *G06F 1/1601* (2013.01); *G06F 1/181* (2013.01); *G06F 2200/1612* (2013.01)

(58) Field of Classification Search
CPC .... G06F 1/1601; G06F 1/1605; G06F 1/1607; G06F 1/181; G06F 2200/1612
See application file for complete search history.

(56) References Cited

U.S. PATENT DOCUMENTS

| | | | | |
|---|---|---|---|---|
| 5,128,662 | A * | 7/1992 | Failla | G06F 1/1624 |
| | | | | 345/905 |
| 6,532,149 | B2 * | 3/2003 | Dhar | G06F 1/162 |
| | | | | 345/905 |
| 6,859,219 | B1 * | 2/2005 | Sall | G06F 1/1683 |
| | | | | 345/905 |
| 7,283,353 | B1 * | 10/2007 | Jordan | H04N 5/64 |
| | | | | 345/1.3 |
| 2005/0253775 | A1 * | 11/2005 | Stewart | G06F 1/1616 |
| | | | | 345/1.1 |
| 2006/0077544 | A1 * | 4/2006 | Stark | G02F 1/13336 |
| | | | | 359/448 |
| 2006/0232496 | A1 * | 10/2006 | Sato | G09F 9/30 |
| | | | | 345/1.3 |
| 2013/0092805 | A1 * | 4/2013 | Funk | F16M 13/00 |
| | | | | 248/274.1 |
| 2022/0397942 | A1 * | 12/2022 | Yao | G06F 1/1624 |
| 2023/0047594 | A1 * | 2/2023 | Wallace | H04N 23/57 |
| 2024/0281025 | A1 * | 8/2024 | Ye | G06F 1/1637 |
| 2025/0068215 | A1 * | 2/2025 | Choi | G06F 1/1641 |

* cited by examiner

*Primary Examiner* — Anthony M Haughton
(74) *Attorney, Agent, or Firm* — Law Offices of Sandy Lipkin; Sandy Lipkin

(57) ABSTRACT

A three-screen display includes a middle display, a left display, and a right display. A right edge of the left display is connected to a left edge of the middle display. A left edge of the right display is connected to a right edge of the middle display, so that the middle display, the left display, and the right display form a whole.

18 Claims, 11 Drawing Sheets

THREE-SCREEN DISPLAY

CROSS-REFERENCE TO RELATED APPLICATIONS

The application claims priority of Chinese patent application CN202522028383X, filed on Sep. 19, 2025, disclosure of which is incorporated herein by reference in its entirety.

TECHNICAL FIELD

The present disclosure relates to the field of display devices, in particular to a three-screen display.

BACKGROUND

In recent years, with the rapid development of technology and the rapid popularization of computers, a display also becomes an important device for people's daily work and entertainment. A traditional display has only a single screen, displaying smaller images and less information, with limited multitasking capability that compromises both entertainment experiences and office productivity. To this end, the present disclosure provides a three-screen display, which can effectively solve the above-mentioned problems.

SUMMARY

In order to overcome the shortcomings of the prior art, the present disclosure provides a three-screen display. The three-screen display includes a middle display, a left display, and a right display.

A right edge of the left display is connected to a left edge of the middle display. A left edge of the right display is connected to a right edge of the middle display. So that the middle display, the left display, and the right display form a whole.

The beneficial effects of the present disclosure are as follows. The present disclosure provides a three-screen display. When a user is is using the three-screen display, the middle display, the left display, and the right display can be combined to expand and enlarge the screen, bringing a better visual experience to the user. At the same time, the middle display, the left display, and the right display can display different content respectively, facilitating the user to view more screen information. The left display and the right display can respectively be rotated 180 degrees relative to the middle display, so that the user can conveniently adjust the left display and the right display for a more comfortable viewing angle, thereby improving the user experience. The left display and the right display can be rotated towards the middle display, thus, the middle display, the left display and the right display can form an annular anti-peep screen space, bringing a more secure use experience to the user.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
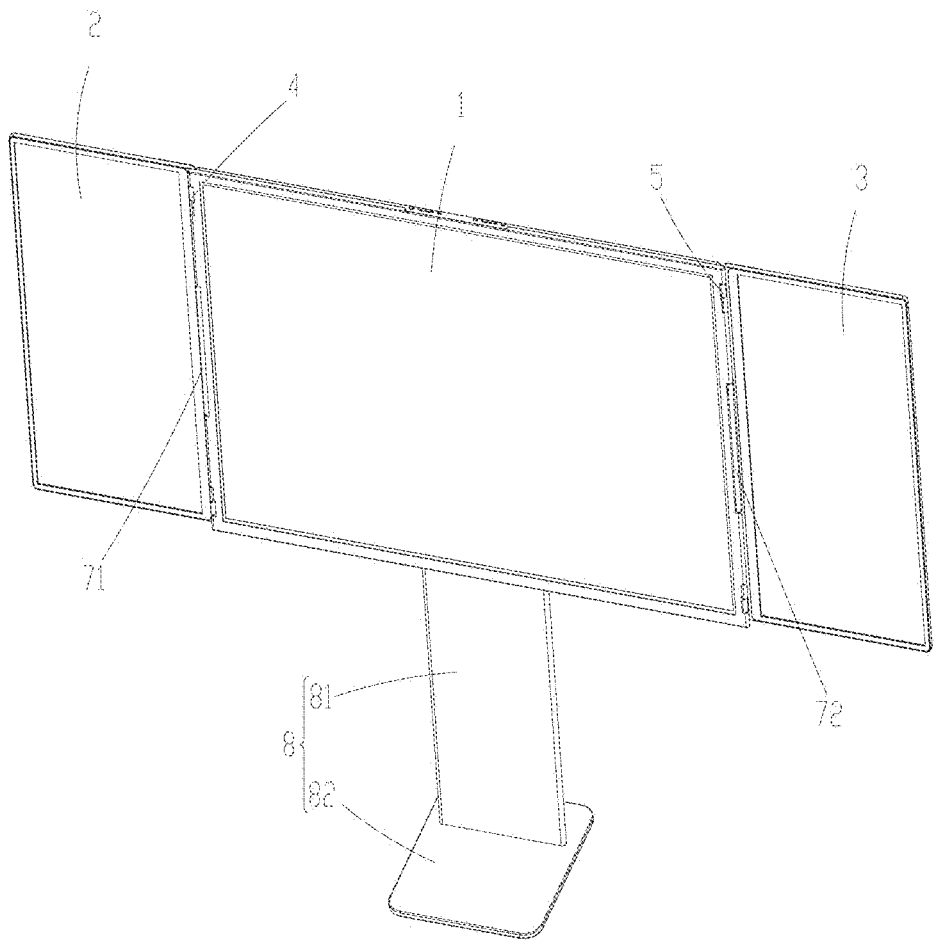
FIG. 1 is a perspective view of a three-screen display of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
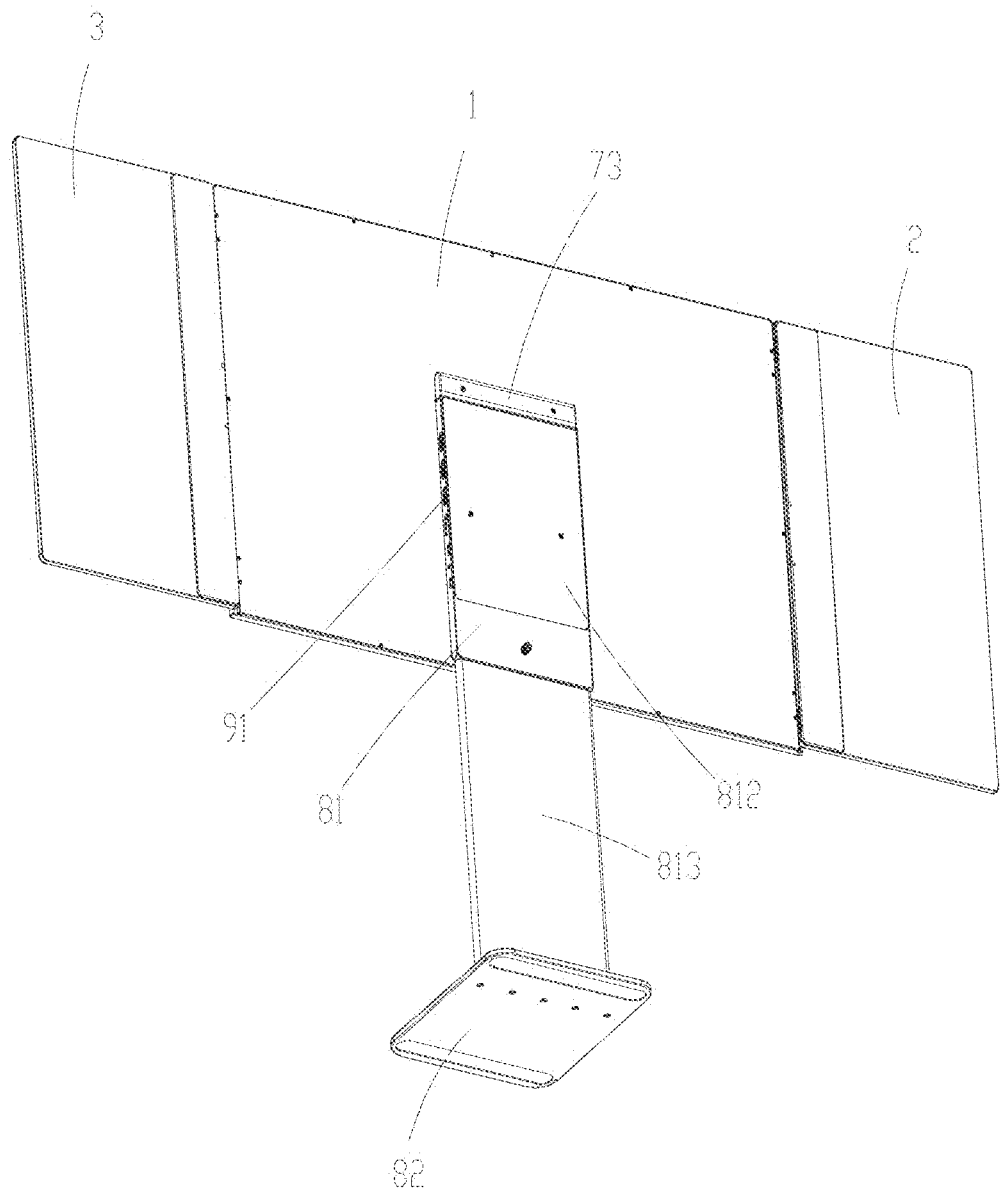
FIG. 2 is another perspective view of the three-screen display of the present disclosure.
Figure 3:
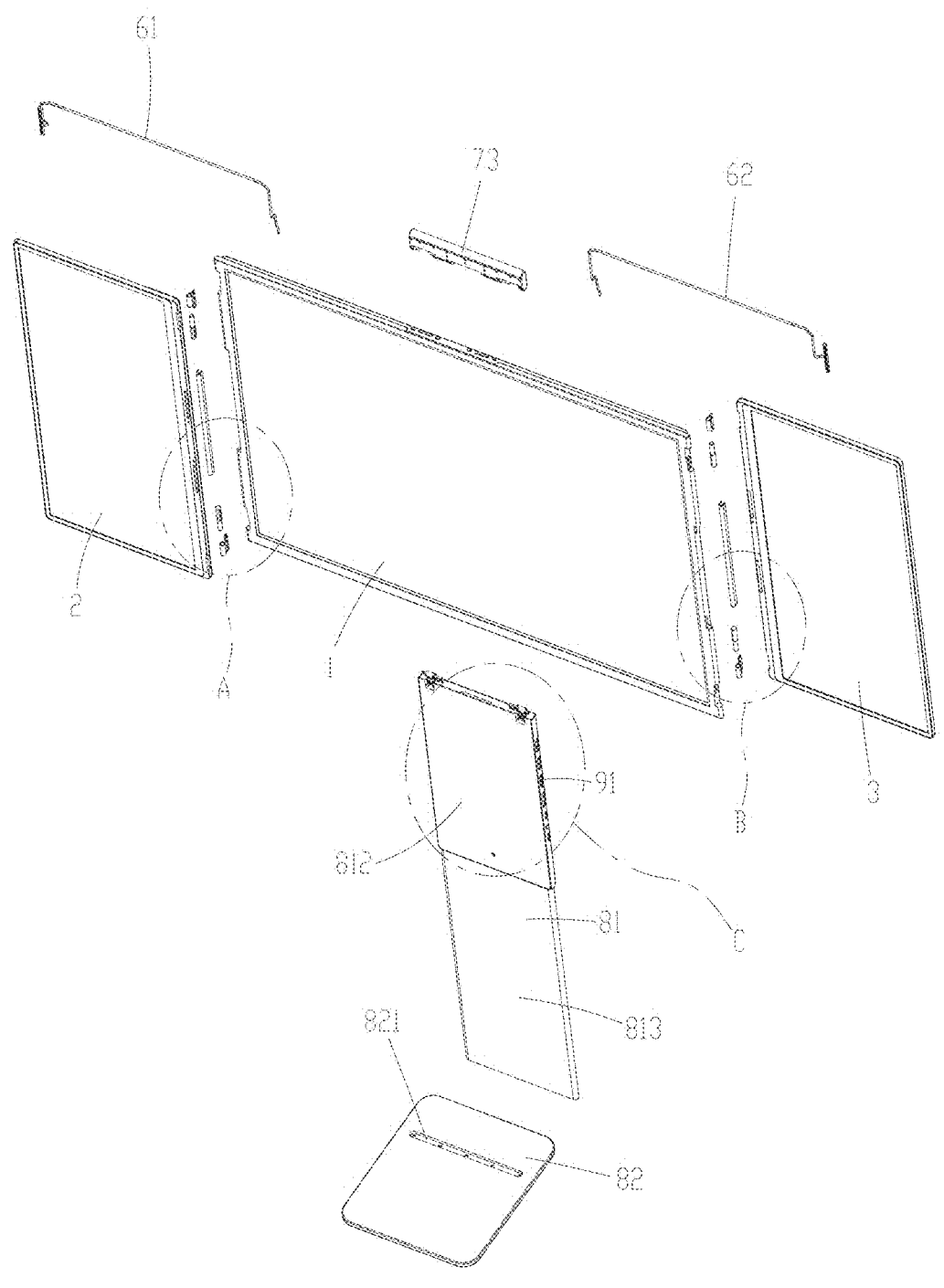
FIG. 3 is an exploded view of the three-screen display of the present disclosure.
Figure 4:
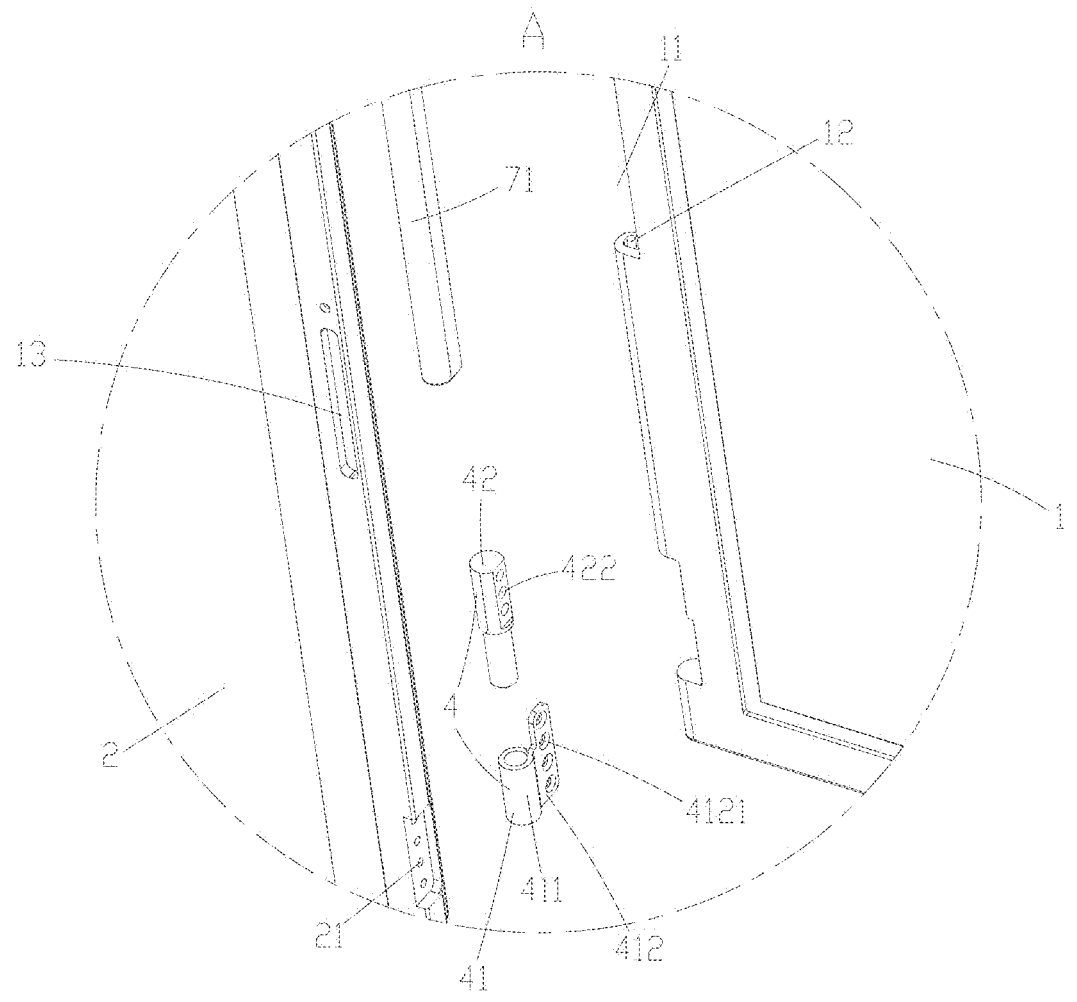
FIG. 4 is an enlarged view at A in FIG. 3.
Figure 5:
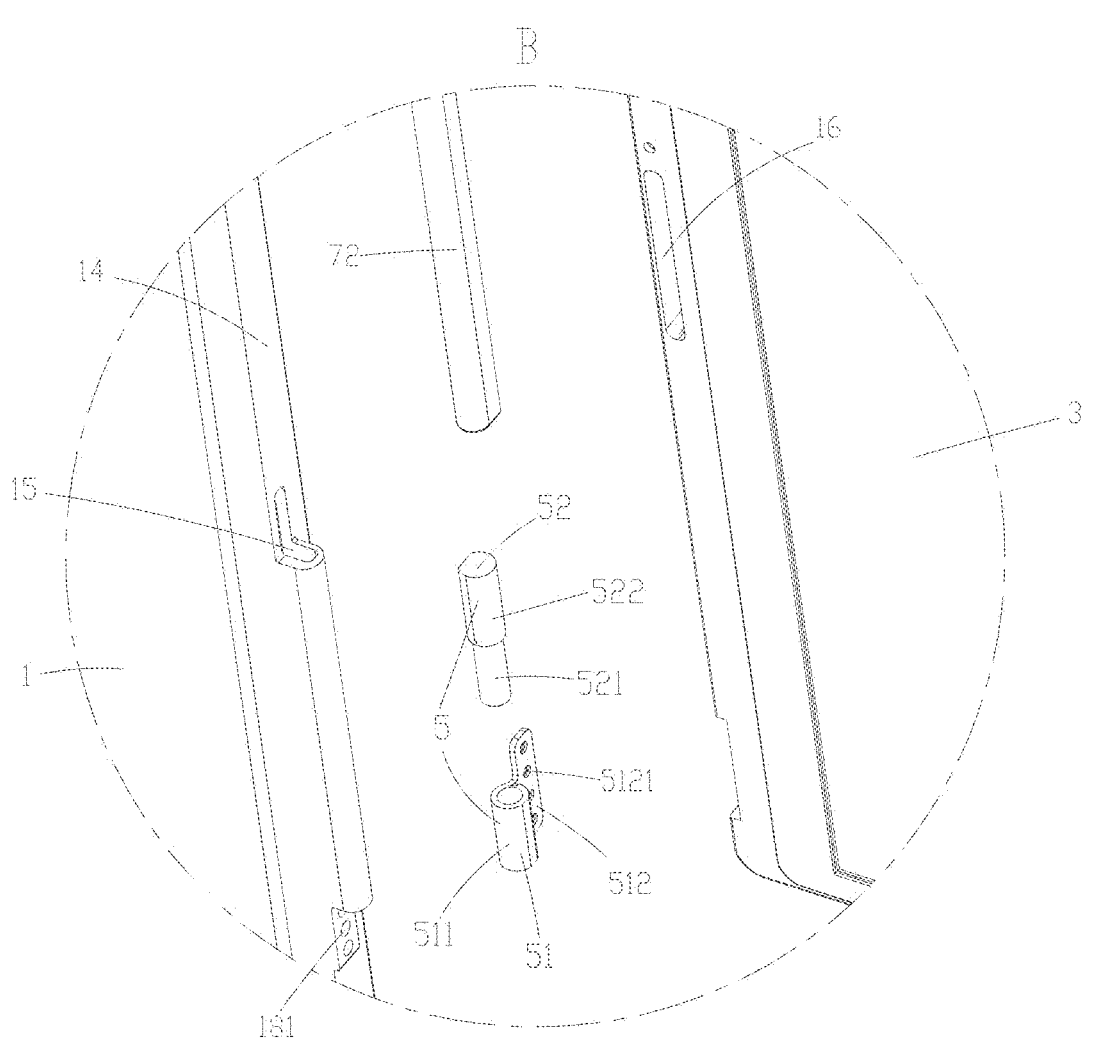
FIG. 5 is an enlarged view at B in FIG. 3.
Figure 6:
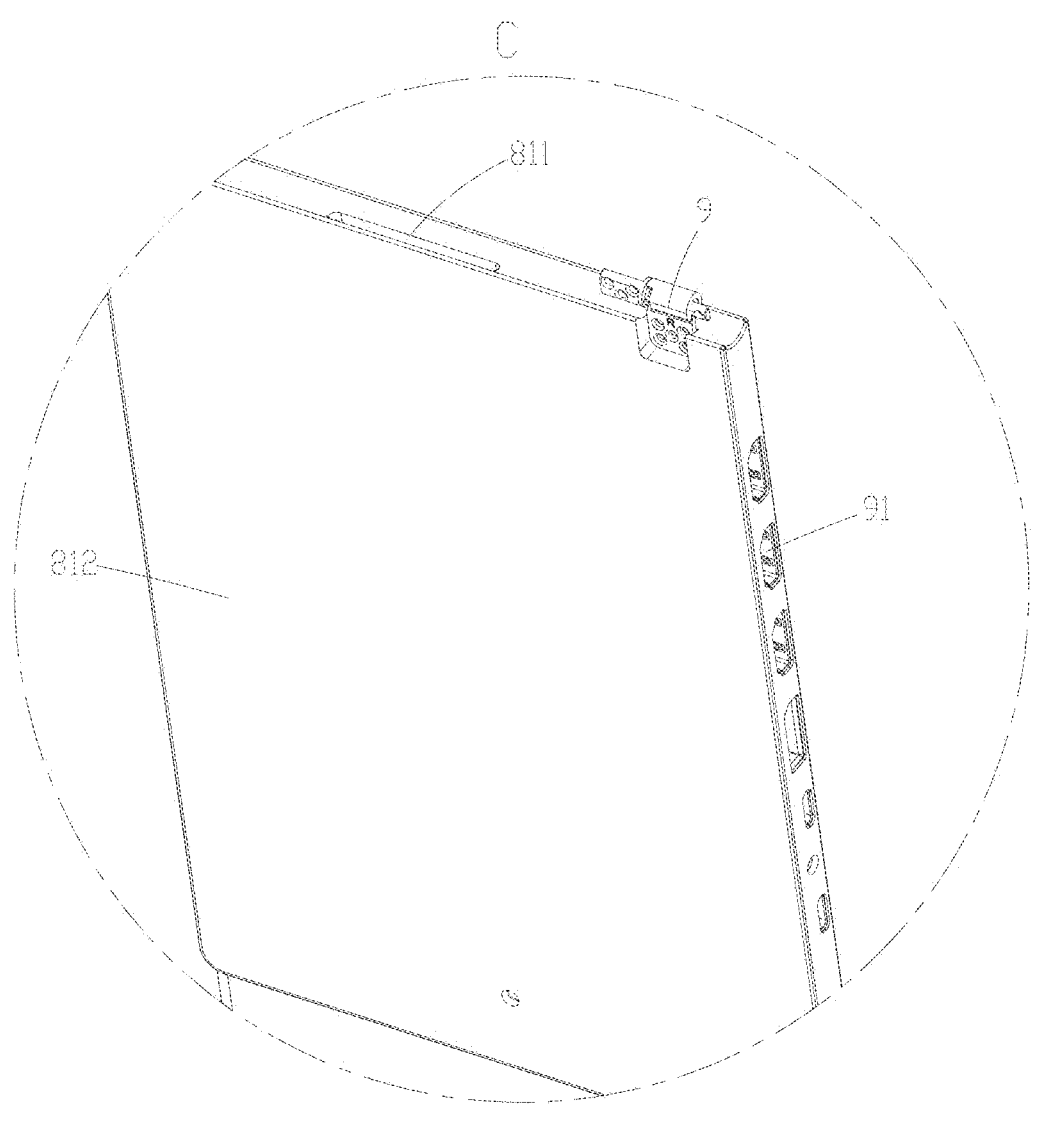
FIG. 6 is an enlarged view at C in FIG. 3.
Figure 7:
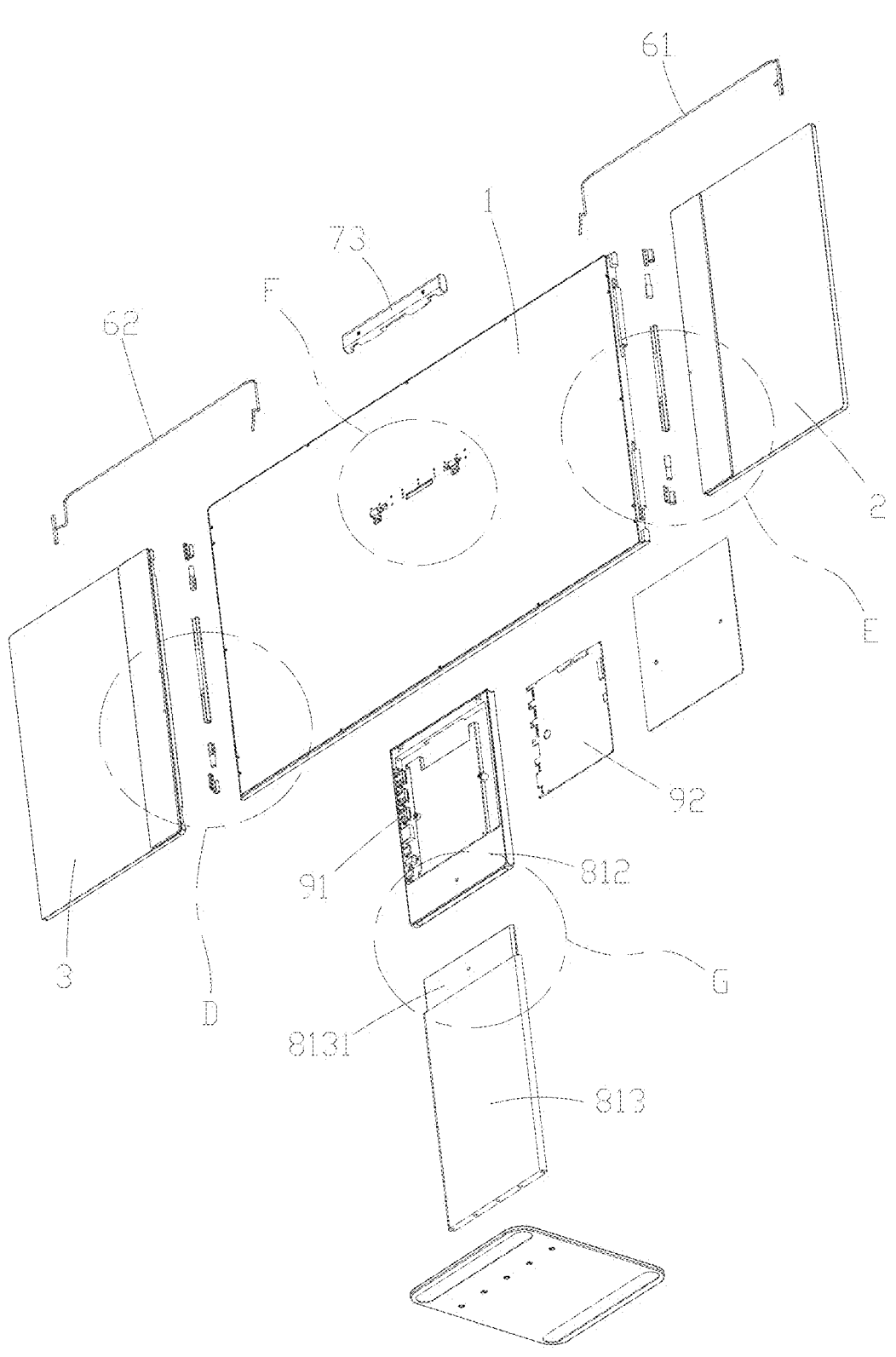
FIG. 7 is another exploded view of the three-screen display of the present disclosure.
Figure 8:
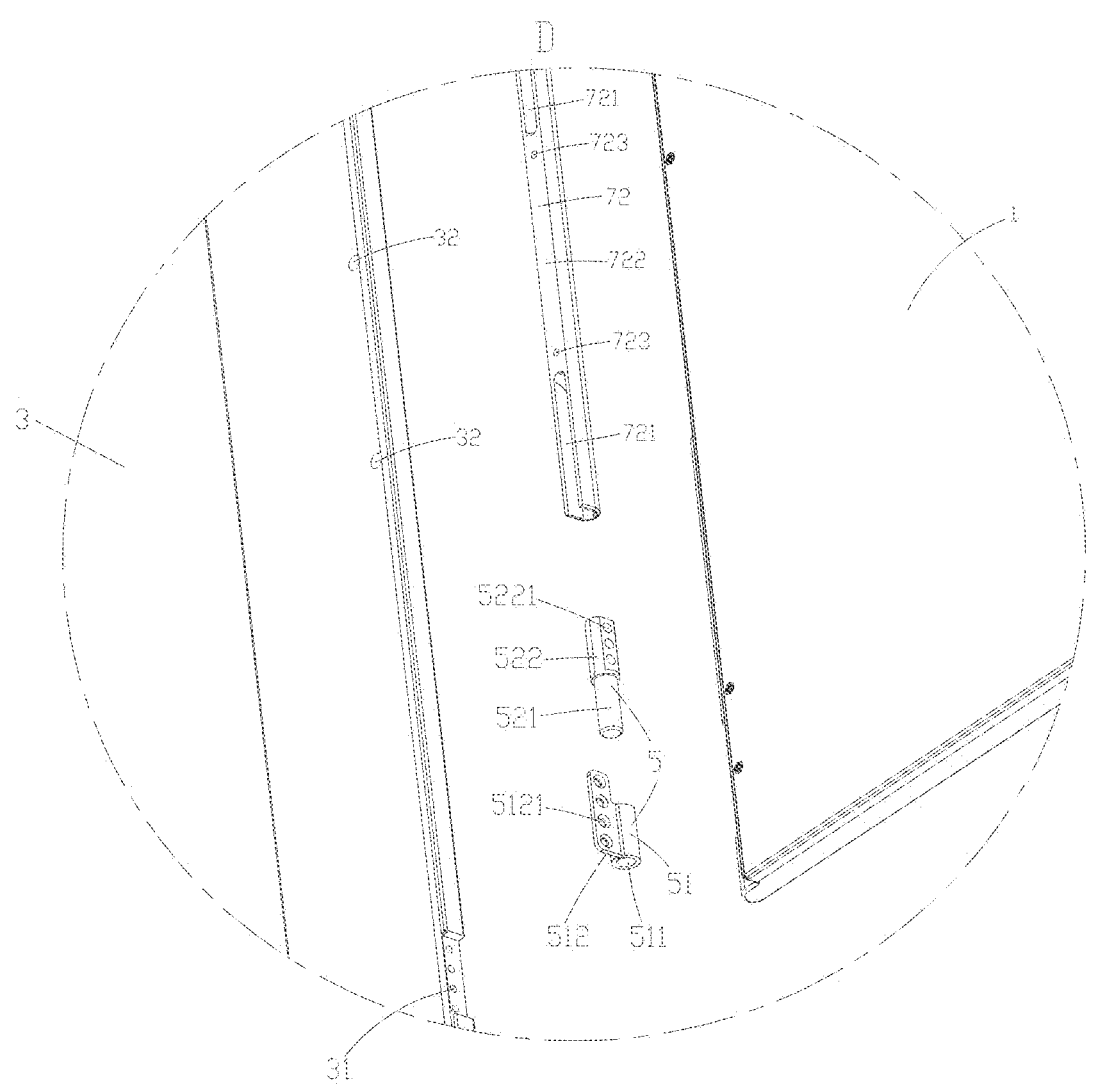
FIG. 8 is an enlarged view at D in FIG. 6.
Figure 9:
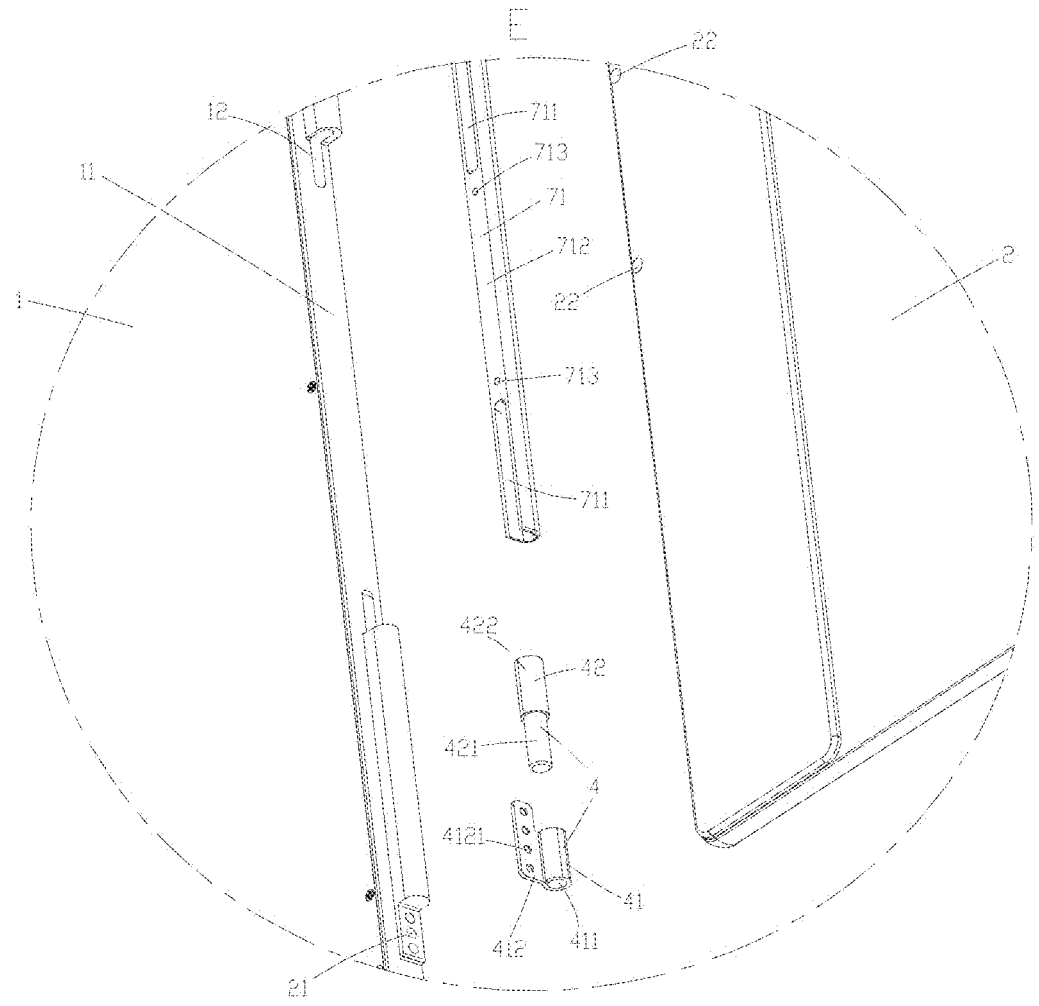
FIG. 9 is an enlarged view at E in FIG. 6.
Figure 10:
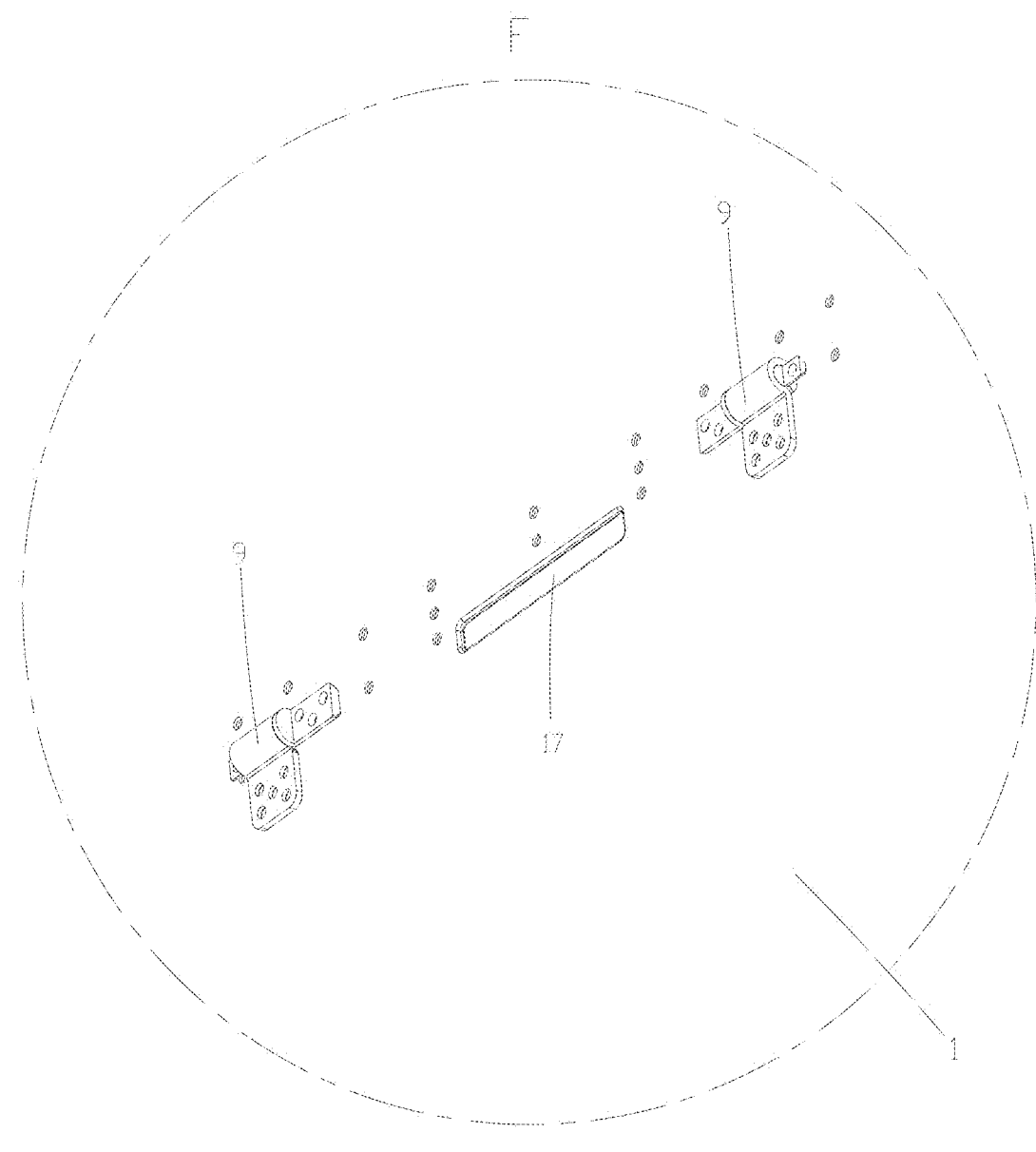
FIG. 10 is an enlarged view at F in FIG. 6.
Figure 11:
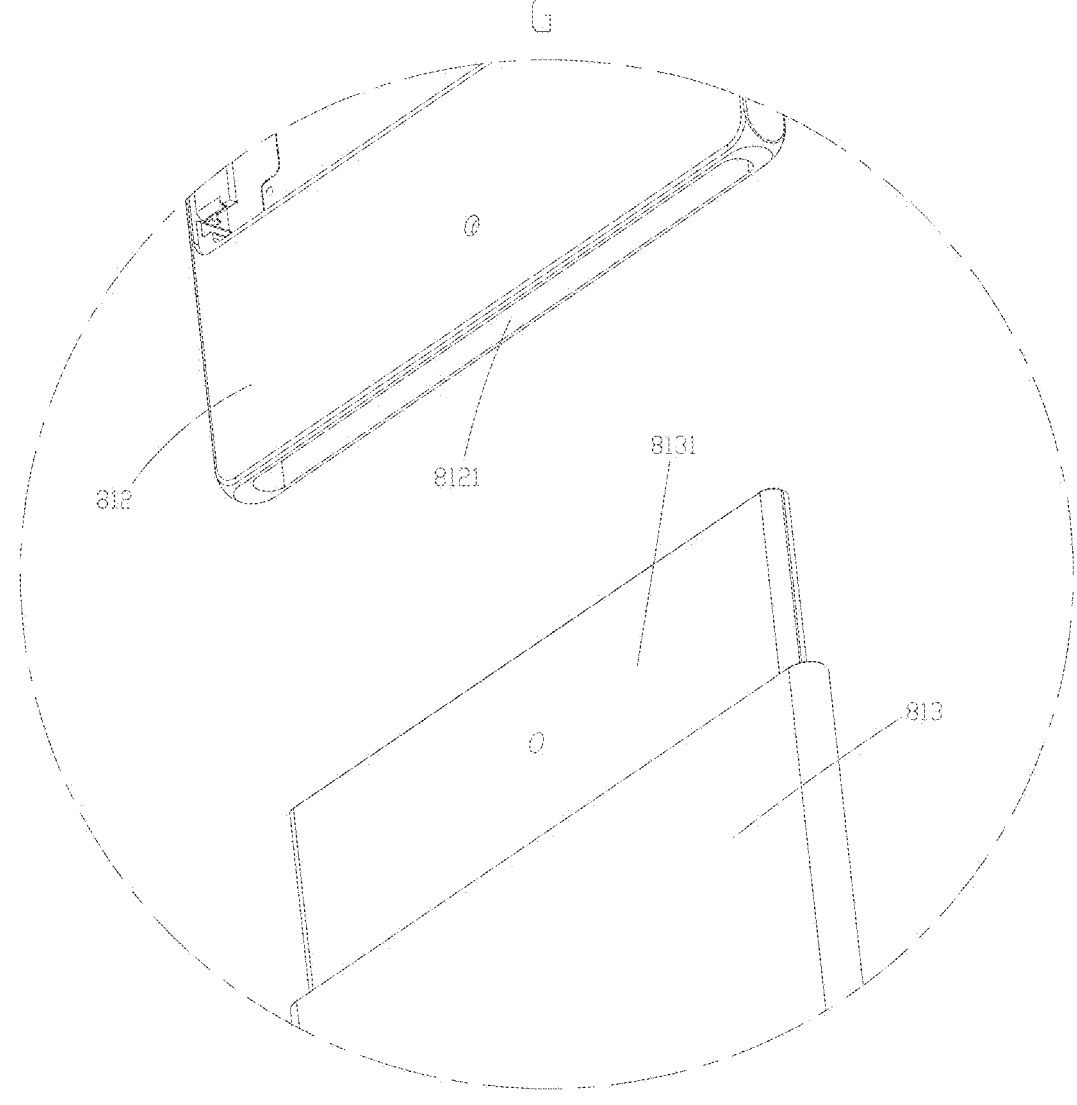
FIG. 11 is an enlarged view at G in FIG. 6.

Referring to FIGS. 1 to 11, the present disclosure provides a three-screen display. The three-screen display includes a middle display 1, a left display 2 and a right display 3.

A right edge of the left display 2 is connected to a left edge of the middle display 1. A left edge of the right display 3 is connected to a right edge of the middle display 1. Thus, the middle display 1, the left display 2, and the right display 3 form a whole. Through the structure above, the left display 2 is arranged on a left side of the middle display 1 and is connected to the middle display 1. The right display 3 is arranged on a right side of the middle display 1 and is connected to the middle display 1. The middle display 1, the left display 2, and the right display 3 form a whole. When the user is using the three-screen display, the middle display 1, the left display 2, and the right display 3 can be combined to expand and enlarge the screen, bringing a better visual experience to the user. In addition, the middle display 1, the left display 2, and the right display 3 can respectively display different content, facilitating the user to view more screen information. The left display and the right display can be rotated towards the middle display, thus, the middle display, the left display and the right display can form an annular anti-peep screen space, bringing a more secure use experience to the user.

In this embodiment, the right edge of the left display 2 is rotatably connected to the left edge of the middle display 1, so that the left display 2 is rotatably connected to the middle display 1. Through the structure above, the left display 2 is rotatably connected to the middle display 1. When the user is using the three-screen display, the user can conveniently adjust the left display 2 by rotating it for a more suitable viewing angle. Quite usefully, the three-screen display further includes a left connecting member 4. The middle display 1, and the left display 2 are respectively connected to the left connecting member 4 and the middle display 1, and the left display 2 is rotatably connected via the left connecting member 4. A total number of the left connecting members 4 is two. Through the structure above, the middle display 1 and the left display 2 are rotatably connected via the left connecting member 4, and the two left connecting members 4 can make the rotatable connection between middle display 1 and the left display 2 more stable. Specifically, the left connecting member 4 includes a first connecting module 41 and a second connecting module 42. The first connecting module 41 includes a first shaft cylinder 411. The second connecting module 42 includes a first shaft body 421. The first shaft body 421 is rotatably arranged in the first shaft cylinder 411, so that the first connecting module 41 and the second connecting module 42 are rotatably connected. The first connecting module 41 further includes a first fixing block 412, and the first fixing block 412 is connected to the left display 2, so that the first connecting module 41 is connected to the left display 2. The second connecting module 42 further includes a second fixing block 422. The second fixing block 422 is connected to the middle display 1, so that the second connecting module 42 is connected to the middle display 1. Through the structure above, the first connecting module 41 is connected to the left display 2 via the first fixing block 412. The second connecting module 42 is connected to the middle display 1 via the second fixing block 422. The first shaft body 421 of the second connecting module 42 is rotatably provided in the first shaft cylinder 411 of the first connecting module 41, so that the middle display 1 and the left display 2 are rotatably connected. The structure is simple and reliable, and the durability is strong.

In the present embodiment, the first fixing block 412 defines a first mounting hole 4121. The left display 2 defines a second mounting hole 21 corresponding to the first mounting hole 4121. An external fastener is inserted through the first mounting hole 4121 and the second mounting hole 21, thus connecting the left connecting member 4 to the left display 2. The second fixing block 422 defines a third mounting hole 4221. The middle display 1 defines a fourth mounting hole 181 corresponding to the third mounting hole 4221. The external fastener is inserted through the third mounting hole 4221 and the fourth mounting hole 181, thus connecting the left connecting member 4 to the middle display 1. Through the structure above, the fastener is inserted through the first mounting hole 4121 and the second mounting hole 21, so that the left connecting member 4 is connected to the left display 2. The fastener is inserted through the third mounting hole 4221 and the fourth mounting hole 181, so that the left connecting member 4 is connected to the middle display 1. Herein, The first mounting holes 4121 are multiple and arranged in sequence; the second mounting holes 21 are multiple and arranged in sequence, so that the left connecting member 4 and the left display 2 can be connected more stably. The third mounting holes 4221 are multiple and arranged in sequence; the fourth mounting holes 181 are multiple and arranged in sequence, so that the left connecting member 4 and the middle display 1 can be connected more stably.

In this embodiment, the left edge of the right display 3 is rotatably connected to the right edge of the middle display 1, so that the right display 3 is rotatably connected to the middle display 1. Through the structure above, the right display 3 is rotatably connected to the middle display 1, facilitating the user to adjust the right display 3 by rotating it for more suitable viewing angle when the user is using the three-screen display. Quite usefully, the three-screen display further includes a right connecting member 5. The middle display 1 and the right display 3 are respectively connected to the right connecting member 5. The middle display 1 and the right display 3 are rotatably connected via the right connecting member 5. A total number of the right connecting members 5 is two. Through the structural arrangement above, the middle display 1 and the right display 3 are rotatably connected via the right connecting member 5, and the two right connecting members 5 can make the rotatable connection between the middle display 1 and the right display 3 more stable. Specifically, the right connecting member 5 includes a third connecting module 51 and a fourth connecting module 52. The third connecting module 51 includes a second shaft cylinder 511. The fourth connecting module 52 includes a second shaft body 521. The second shaft body 521 is rotatably arranged in the second shaft cylinder 511, so that the third connecting module 51 and the fourth connecting module 52 are rotatably connected. The third connecting module 51 further includes a third fixing block 512. The third fixing block 512 is connected to the right display 3, so that the third connecting module 51 is connected to the right display 3. The fourth connecting module 52 further includes a fourth fixing block 522, and the fourth fixing block 522 is connected to the middle display 1, so that the fourth connecting module 52 is connected to the middle display 1. Through the structure above, the third connecting module 51 is connected to the right display 3 via the third fixing block 512. The fourth connecting module 52 is connected to the middle display 1 via the fourth fixing block 522. The second shaft body 521 of the fourth fixing block 522 is rotatably arranged in the second shaft cylinder 511 of the third connecting module 51, so that the middle display 1 and the right display 3 are rotatably connected. The structure is simple and reliable, and the durability is strong.

In the present embodiment, the third fixing block 512 defines a fifth mounting hole 5121. The right display 3 defines a sixth mounting hole 31 corresponding to the fifth mounting hole 5121. The external fastener is inserted through the fifth mounting hole 5121 and the sixth mounting hole 31, thus connecting the right connecting member 5 to the right display 3. The fourth fixing block 522 defines a seventh mounting hole 5221. The middle display 1 defines an eighth mounting hole 182 corresponding to the seventh mounting hole 5221. The external fastener is inserted through the seventh mounting hole 5221 and the eighth mounting hole 182, thus connecting the right connecting member 5 to the middle display 1. Through the structure above, the external fastener is inserted through the fifth mounting hole 5121 and the sixth mounting hole 31, so that the right connecting member 5 is connected to the right display 3. The external fastener is inserted through the seventh mounting hole 5221 and the eighth mounting hole 182, so that the right connecting member 5 is connected to the middle display 1. The fifth mounting holes 5121 are multiple and arranged in sequence; the sixth mounting holes 31 are multiple and arranged in sequence, so that the right connecting member 5 can be connected to the right display 3 more stably. The seventh mounting holes 5221 are multiple and arranged in sequence; the eighth mounting holes 182 are multiple and arranged in sequence, so that the right connecting member 5 can be connected to the middle display 1 more stably.

In the present embodiment, a length of the middle display 1 is greater than a length of the left display 2, so that the left display 2 blocks part of the middle display 1 after being rotated towards the middle display 1. Through the structure above, the length of the middle display 1 is greater than the length of the left display 2, thus, after the left display 2 is folded toward the middle display 1, the left display 2 only blocks part of the middle display 1, and does not completely block the middle display 1, convenient for the user to view the middle display 1.

In the present embodiment, the length of the middle display 1 is greater than a length of the right display 3, so that the right display 3 blocks part of the middle display 1 after being rotated towards the middle display 1. Through the structure above, the length of the middle display 1 is greater than the length of the right display 3. After the right display 3 is folded toward the middle display 1, the right display 3 only blocks part of the middle display 1, and does not completely block the middle display 1, thereby facilitating the user to view the middle display 1.

In this embodiment, the length of the left display 2 is less than half of the length of the middle display 1. The length of the right display 3 is less than half of the length of the middle display 1. The length of the left display 2 is equal to the length of the right display 3. The widths of the middle display 1, the left display 2, and the right display 3 are identical. Through the structure above, the lengths of the left display 2 and the right display 3 are identical, so that the left display 2 and the right display 3 are more symmetrical and more balanced on two sides of the middle display 1.

In the present embodiment, the length of the left display and the length of the right display 3 are added to be smaller than the length of the middle display 1, so that when a front surface of the left display 2 and a front surface of the right display 3 rotate towards a front surface of the middle display 1, an outermost edge of the left display 2 and an outermost edge of the right display 3 do not abut against each other. Through the structural arrangement above, the length of the left display 2 and the length of the right display 3 are added to be less than the length of the middle display 1, so that when the front surface of the left display 2 and the front surface of the right display 3 rotate towards the front surface of the middle display 1, the outermost edge of the left display 2 and the outermost edge of the right display 3 do not abut against each other, so as to prevent the left display 2 and the right display 3 from touching each other and causing wear.

In the present embodiment, the left display 2 is rotatable between a maximum folded position and a maximum unfolded position. When the left display 2 is in the maximum folded position, the front surface of the left display 2 abuts against the front surface of the middle display 1. When the left display 2 is rotated to the maximum unfolded position, part of the front surface of the left display 2 abuts against part of a rear surface of the middle display 1, so as to prevent the left display 2 from continuing to rotate relative to the middle display 1. The right display 3 is rotatable between a maximum folded position and a maximum unfolded position. When the right display 3 is in the maximum folded position, the front surface of the right display 3 abuts against the front surface of the middle display 1. When the right display 3 is rotated to the maximum unfolded position, part of the front surface of the right display 3 abuts against part of the rear surface of the middle display 1, so as to prevent the right display 3 from continuing to rotate relative to the middle display 1. Through the structure above, the left display 2 can rotate 180 degrees relative to the middle display 1 between the maximum folding position and the maximum unfolding position, allowing the user to adjust the left display 2 to a better viewing angle. The right display 3 can rotate 180 degrees relative to the middle display 1 between the maximum folding position and the maximum unfolding position, allowing the user to adjust the right display 3 to a better viewing angle.

In the present embodiment, the left side edge of the middle display 1 defines a left slot 11. The middle display 1 defines at least one first wire hole 12. The first wire hole 12 is defined in the left slot 11. The left display 2 defines at least one second wire hole 13. The second wire hole 13 is positioned to correspond with the first wire hole 12. The three-screen display includes a first wire 61. The first wire 61 is threaded through the first wire hole 12 and the second wire hole 13. The first wire 61 is configured for connecting the middle display 1 and the left display 2, so that the middle display 1 and the left display 2 are electrically connected. Through the structure above, the first wire 61 is connected to the middle display 1 and the left display 2, so that the middle display 1 and the left display 2 are electrically connected. The first wire 61 is threaded through the first wire hole 12 and the second wire hole 13, so that the first wire 61 is not exposed, improving the use safety.

In the present embodiment, the right side edge of the middle display 1 defines a right slot 14. The middle display 1 defines at least one third wire hole 15. The third wire hole 15 is defined in the right slot 14. The right display 3 defines at least one fourth wire hole 16. The fourth wire hole 16 is positioned to correspond with the third wire hole 15. The three-screen display defines a second wire 62. The second wire 62 is threaded through the third wire hole 15 and the fourth wire hole 16. The second wire 62 is configured for connecting the middle display 1 and the right display 3, so that the middle display 1 and the right display 3 are electrically connected. Through the structure above, the second wire 62 is configured for connecting the middle display 1 and the right display 3, so that the middle display 1 and the right display 3 are electrically connected. The second wire 62 is threaded through the third wire hole 15 and the fourth wire hole 16, so that the second wire 62 is not exposed, improving the use safety.

In the present embodiment, the three-screen display includes a left decorative cover 71. The left decorative cover 71 is detachably connected to the left display 2. The left decorative cover 71 is arranged in the left slot 11. The left decorative cover 71 defines at least one first wire slot 711. The first wire slot 711 is in communication with the first wire hole 12 and the second wire hole 13. The first wire slot 711 is configured for accommodating the first wire 61. Through the structure above, the left decorative cover 71 is detachably connected to the left display 2. A size of the left decorative cover 71 matches that of the left slot 11. The left decorative cover 71 is rotatable in the left slot 11. The left decorative cover 71 defines at least one first wire slot 711. The first wire slot 711 is in communication with the first wire hole 12 and the second wire hole 13. When the left decorative cover 71 covers the left display 2, the first wire slot 711 accommodates and completely blocks the first wire 61, improving the overall aesthetics and safety.

In the present embodiment, the left decorative cover 71 further includes at least one left block 712. The left block 712 is arranged between the plurality of first wire slots 711 to separate the plurality of first wire slots 711. Through the structural arrangement above, the left block 712 is arranged between the plurality of first wire slots 711, preventing the wires in the plurality of first wire slots 711 from short circuits caused by the wires abutting each other.

In the present embodiment, the left decorative cover 71 includes a ninth mounting hole 713. The left display 2 includes a tenth mounting hole 22. The external fastener is inserted into the ninth mounting hole 713 and the tenth mounting hole 22 to connect the left decorative cover 71 to the left display 2. Through the structural arrangement above, the external fastener is inserted into the ninth mounting hole 713 and the tenth mounting hole 22, so that the left decorative cover 71 is connected to the left display 2. The external fastener can be a screw, a rivet, etc. The structure is simple and reliable with low cost.

In the present embodiment, the three-screen display includes a right decorative cover 72. The right decorative cover 72 is detachably connected to the right display 3. The right decorative cover 72 is arranged in the right slot 14. The right decorative cover 72 includes at least one second wire slot 721. The second wire slot 721 is in communication with the third wire hole 15 and the fourth wire hole 16. The second wire slot 721 is configured for accommodating the second wire 62. Through the structure above, the right decorative cover 72 is detachably connected to the right display 3. A size of the right decorative cover 72 matches that of the right slot 14. The right decorative cover 72 is rotatable in the right groove 14. The right decorative cover 72 includes at least one second wire slot 721. The second wire slot 721 is in communication with the third wire hole 15 and the fourth wire hole 16. When the right decorative cover 72 covers the right display 3, the second wire slot 721 accommodates and completely blocks the second wire 62, improving the overall aesthetics and safety.

In the present embodiment, the right decorative cover 72 further includes at least one right block 722 provided between the plurality of second wire slots 721 such that the plurality of second wire slots 721 are spaced apart. Through the structural arrangement above, the right block 722 is provided between the plurality of second wire slots 721, preventing the wires in the plurality of second wire slots 721 from short circuits caused by the wires abutting each other.

In the present embodiment, the right decorative cover 72 includes an eleventh mounting hole 723. The right display 3 includes a twelfth mounting hole 32. The external fastener is inserted into the eleventh mounting hole 723 and the twelfth mounting hole 32, thus connecting the right decorative cover 72 to the right display 3. Through the structure above, the external fastener is inserted into the eleventh mounting hole 723 and the twelfth mounting hole 32, so that the right decorative cover 72 is connected to the right display 3. The external fastener can be a screw, a rivet, etc. The structure is simple and reliable with low cost.

In the present embodiment, the three-screen display further includes a stand 8 and a rotating connecting member 9. The rotating connecting member 9 is respectively connected to the stand 8 and the middle display 1, such that the stand 8 is configured for supporting the three-screen display. The stand 8 includes a supporting portion 81 and a base 82. A first end of the supporting portion 81 is detachably connected to the base 82. A second end of the supporting portion 81 is rotatably connected to the middle display 1. Through the structure above, the three-screen display further includes the stand 8 and the rotating connecting member 9. The rotating connecting member 9 is rotatable. The rotating connecting member 9 is respectively connected to the stand 8 and the middle display 1, so that the stand 8 is rotatably connected to the middle display 1, facilitating the user to adjust an angle of the middle display 1. The stand 8 includes the supporting portion 81 and the base 82. The base 82 is configured for being placed on a desktop to support the three-screen display. The supporting portion 81 and the base 82 are detachably connected, facilitating the installation and detachment of the user.

In the present embodiment, the base 82 includes a first inserting slot 821. The first end of the supporting portion 81 is inserted into the first inserting slot 821, so that the supporting portion 81 and the base 82 are detachably connected. Through the structure above, a size of the first inserting slot 821 matches a size of the supporting portion 81. After being inserted into the first inserting slot 821, the supporting portion 81 can be fixed by the external fastener. The structure is simple and reliable.

In the present embodiment, the supporting portion 81 includes an upper supporting member 812 and a lower supporting member 813. The upper supporting member 812 and the lower supporting member 813 are detachably connected. The upper supporting member 812 includes a second inserting slot 8121. A first end of the lower supporting member 813 is provided with a connecting portion 8131, and the connecting portion 8131 is inserted into the second inserting slot 8121, such that the lower supporting member 813 is detachably connected to the upper supporting member 812. Through the structure above, the connecting portion 8131 of the lower supporting member 813 is inserted into the second inserting slot 8121 of the upper supporting member 812, so that the upper supporting member 812 and the lower supporting member 813 can be detachably connected. A volume of the supporting portion 81 can be reduced to facilitate detachment.

In the present embodiment, the three-screen display includes a plurality of interfaces 91 and a circuit board 92. The interface 91 is arranged on the supporting portion 81. The circuit board 92 is arranged inside the supporting portion 81. The interface 91 is electrically connected to the circuit board 92, and the circuit board 92 is electrically connected to the middle display 1. A rear surface of the middle display 1 includes a fifth wire hole 17. The supporting portion 81 further includes a sixth wire hole 811. The wire is threaded through the fifth wire hole 17 and the sixth wire hole 811 to connect the circuit board 92 with the middle display 1. The three-screen display further includes a middle decorative cover 73. The middle decorative cover 73 is mounted on the middle display 1 and covers the fifth wire hole 17 and the sixth wire hole 811. Through the structural arrangement above, the interface 91 is provided on the supporting portion 81. The circuit board 92 is arranged inside the supporting portion 81. The interface 91 is electrically connected to the circuit board 92. A position design of the plurality of interfaces 91 does not encroach on the space of the middle display 1, the left display 2 and the right display 3, so that the middle display 1, the left display 2 and the right display 3 can be thinner. The circuit board 92 is electrically connected to the middle display 1, the wire is threaded through the fifth wire hole 17 and the sixth wire hole 811 to connect the circuit board 92 and the middle display 1. The three-screen display further includes a middle decorative cover 73. The middle decorative cover 73 is mounted on the middle display 1. The middle decorative covers and completely blocks the fifth wire hole 17 and the sixth wire hole 811, improving the overall aesthetics.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

The invention claimed is:

1. A three-screen display, comprising:

a middle display, a left display and a right display, wherein a right edge of the left display is connected to a left edge of the middle display, a left edge of the right display is connected to a right edge of the middle display, so that the middle display, the left display and the right display form a whole;

wherein a left slot is defined at a left edge of the middle display, the middle display defines at least one first wire hole, the first wire hole is defined in the left slot, the left display defines at least one second wire hole, the second wire hole is positioned to correspond with the first wire hole, the three-screen display comprises a first wire, the first wire is threaded through the first wire hole and the second wire hole, and the first wire is configured for connecting the middle display and the left display, so that the middle display and the left display are electrically connected;

wherein the three-screen display comprises a left decorative cover, the left decorative cover is detachably connected to the left display, and the left decorative cover is arranged in the left slot; the left decorative cover defines at least one first wire slot, the first wire slot is in communication with the first wire hole and the second wire hole, and the first wire slot is configured for accommodating the first wire; the left decorative cover further comprises at least one left block, the left block is arranged between the plurality of first wire slots, so that the plurality of first wire slots are spaced apart; the left decorative cover defines a ninth mounting hole, the left display defines a tenth mounting hole, and the external fastener is inserted into the ninth mounting hole and the tenth mounting hole, thus connecting the left decorative cover to the left display.

2. The three-screen display according to claim 1, wherein the right edge of the left display is rotatably connected to the left edge of the middle display, so that the left display is rotatably connected to the middle display.

3. The three-screen display according to claim 1, wherein the left edge of the right display is rotatably connected to the right edge of the middle display, so that the right display is rotatably connected to the middle display.

4. The three-screen display according to claim 1, wherein a length of the middle display is greater than a length of the left display, so that the left display blocks part of the middle display after being rotated towards the middle display.

5. The three-screen display according to claim 4, wherein the length of the middle display is greater than a length of the right display, so that the right display blocks part of the middle display after being rotated towards the middle display.

6. The three-screen display according to claim 5, wherein a total length of the left display and the right display is less than the length of the middle display, so that when a front surface of the left display and a front surface of the right display rotate towards a front surface of the middle display, an outermost edge of the left display and an outermost edge of the right display do not abut against each other.

7. The three-screen display according to claim 6, wherein the length of the left display is less than half of the length of the middle display, the length of the right display is less than half of the length of the middle display, and the length of the left display is equal to the length of the right display; and the middle display, the left display and the right display are identical in width.

8. The three-screen display according to claim 2, wherein the left display is rotatable between a maximum folded position and a maximum unfolded position; when the left display is in the maximum folded position, a front surface of the left display abuts against the front surface of the middle display; when the left display is rotated to the maximum unfolded position, part of the front surface of the left display abuts against part of the rear surface of the middle display, so as to prevent the left display from continuing to rotate relative to the middle display; the right display is rotatable between a maximum folded position and a maximum unfolded position; when the right display is in the maximum folded position, a front surface of the right display abuts against the front surface of the middle display; when the right display is rotated to the maximum unfolded position, part of the front surface of the right display abuts against part of the rear surface of the middle display, so as to prevent the right display from continuing to rotate relative to the middle display.

9. The three-screen display according to claim 1, wherein the three-screen display further comprises a left connecting member, the middle display and the left display are respectively connected to the left connecting member, the middle display and the left display is rotatably connected via the left connecting member; and a total number of the left connecting members is two.

10. The three-screen display according to claim 9, wherein the left connecting member comprises a first connecting module and a second connecting module, the first connecting module comprises a first shaft cylinder, the second connecting module comprises a first shaft body, the first shaft body is rotatably arranged in the first shaft cylinder, so that the first connecting module and the second connecting module are rotatably connected.

11. The three-screen display according to claim 9, wherein the first connecting module further comprises a first fixing block, and the first fixing block is connected to the left display, so that the first connecting module is connected to the left display; the second connecting module further comprises a second fixing block, and the second fixing block is connected to the middle display, so that the second connecting module is connected to the middle display; the first fixing block defines a first mounting hole, the left display defines a second mounting hole corresponding to the first mounting hole, and an external fastener is inserted through the first mounting hole and the second mounting hole, thus connecting the left connecting member to the left display; the second fixing block defines a third mounting hole, the middle display defines a fourth mounting hole corresponding to the third mounting hole, the external fastener is inserted through the third mounting hole and the fourth mounting hole, thus connecting the left connecting member to the middle display; the first mounting holes are multiple and arranged in sequence; the second mounting holes are multiple and arranged in sequence; the third mounting holes are multiple and arranged in sequence; the fourth mounting holes are multiple and arranged in sequence.

12. The three-screen display according to claim 1, wherein the three-screen display further comprises a right connecting member, the middle display and the right display are respectively connected to the right connecting member, the middle display and the right display are rotatably connected via the right connecting member, and a total number of the right connecting members is two.

13. The three-screen display according to claim 12, wherein the right connecting member comprises a third connecting module and a fourth connecting module, the third connecting module comprises a second shaft cylinder, the fourth connecting module comprises a second shaft body, the second shaft body is rotatably arranged in the second shaft cylinder, so that the third connecting module and the fourth connecting module are rotatably connected.

14. The three-screen display according to claim 12, wherein the third connecting module further comprises a third fixing block, and the third fixing block is connected to the right display, so that the third connecting module is connected to the right display; the fourth connecting module further comprises a fourth fixing block, and the fourth fixing block is connected to the middle display, so that the fourth connecting module is connected to the middle display; the third fixing block defines a fifth mounting hole, the right display comprises a sixth mounting hole corresponding to the fifth mounting hole, the external fastener is inserted through the fifth mounting hole and the sixth mounting hole, thus connecting the right connecting member to the right display; the fourth fixing block defines a seventh mounting hole, the middle display defines an eighth mounting hole corresponding to the seventh mounting hole, the external fastener is inserted through the seventh mounting hole and the eighth mounting hole, thus connecting the right connecting member to the middle display; the fifth mounting holes are multiple and arranged in sequence; the sixth mounting holes are multiple and arranged in sequence; the seventh mounting holes are multiple and arranged in sequence; the eighth mounting holes are multiple and arranged in sequence.

15. The three-screen display according to claim 1, wherein a right side edge of the middle display defines a right slot, the middle display defines at least one third wire hole, the third wire hole is defined in the right slot, the right display defines at least one fourth wire hole, the fourth wire hole is positioned to correspond with the third wire hole, the three-screen display comprises a second wire, the second wire is threaded through the third wire hole and the fourth wire hole, and the second wire is configured for connecting the middle display and the right display, so that the middle display and the right display are electrically connected.

16. The three-screen display according to claim 1, wherein the three-screen display further comprises a stand and a rotating connecting member, the rotating connecting member is respectively connected to the stand and the middle display, so that the stand is rotatably connected to the middle display, and the stand is configured for supporting the three-screen display; the stand comprises a supporting portion and a base, a first end of the supporting portion is detachably connected to the base, and a second end of the supporting portion is rotatably connected to the middle display; the base defines a first inserting slot, and the first end of the supporting portion is inserted into the first inserting slot, so that the supporting portion and the base are detachably connected.

17. A three-screen display, comprising:

a middle display, a left display and a right display, wherein a right edge of the left display is connected to a left edge of the middle display, a left edge of the right display is connected to a right edge of the middle display, so that the middle display, the left display and the right display form a whole;

wherein a right side edge of the middle display defines a right slot, the middle display defines at least one third wire hole, the third wire hole is defined in the right slot, the right display defines at least one fourth wire hole, the fourth wire hole is positioned to correspond with the third wire hole, the three-screen display comprises a second wire, the second wire is threaded through the third wire hole and the fourth wire hole, and the second wire is configured for connecting the middle display and the right display, so that the middle display and the right display are electrically connected;

wherein the three-screen display comprises a right decorative cover, the right decorative cover is detachably connected to the right display, and the right decorative cover is arranged in the right slot; the right decorative cover defines at least one second wire slot, the second wire slot is in communication with the third wire hole and the fourth wire hole, and the second wire slot is configured for accommodating the second wire; the right decorative cover further comprises at least one right block, and the right block is arranged between the plurality of second wire slots, so that the plurality of second wire slots are spaced apart; the right decorative cover defines an eleventh mounting hole, the right display defines a twelfth mounting hole, and the fastener is inserted into the eleventh mounting hole and the twelfth mounting hole, thus connecting the right decorative cover to the right display.

18. A three-screen display, comprising:

a middle display, a left display and a right display, wherein a right edge of the left display is connected to a left edge of the middle display, a left edge of the right display is connected to a right edge of the middle display, so that the middle display, the left display and the right display form a whole;

wherein the three-screen display further comprises a stand and a rotating connecting member, the rotating connecting member is respectively connected to the stand and the middle display, so that the stand is rotatably connected to the middle display, and the stand is configured for supporting the three-screen display; the stand comprises a supporting portion and a base, a first end of the supporting portion is detachably connected to the base, and a second end of the supporting portion is rotatably connected to the middle display; the base defines a first inserting slot, and the first end of the supporting portion is inserted into the first inserting slot, so that the supporting portion and the base are detachably connected;

wherein the supporting portion comprises an upper supporting member and a lower supporting member, and the upper supporting member and the lower supporting member are detachably connected; the upper supporting member defines a second inserting slot, a first end of the lower supporting member is provided with a connecting portion, and the connecting portion is inserted into the second inserting slot, so that the lower supporting member is detachably connected to the upper supporting member; the three-screen display comprises a plurality of interfaces and a circuit board, the interface is arranged on the supporting portion, the circuit board is arranged inside the supporting portion, the interface is electrically connected to the circuit board, and the circuit board is electrically connected to the middle display; a rear surface of the middle display defines a fifth wire hole, the supporting portion further defines a sixth wire hole, and the wire is threaded through the fifth wire hole and the sixth wire hole to connect the circuit board and the middle display; the three-screen display further comprises a middle deco- rative cover, the middle decorative cover is mounted on the middle display and covers the fifth wire hole and the sixth wire hole.

\* \* \* \* \*